United States Patent
Yang et al.

(10) Patent No.: US 10,233,264 B2
(45) Date of Patent: Mar. 19, 2019

(54) PROCESS FOR PREPARING (1→6)-α-D-GLUCAN

(71) Applicant: SOUTH CHINA BOTANICAL GARDEN, CHINESE ACADEMY OF SCIENCES, Guangzhou, Guangdong (CN)

(72) Inventors: Bao Yang, Guangzhou (CN); Yueming Jiang, Guangzhou (CN)

(73) Assignee: SOUTH CHINA BOTANICAL GARDEN, CHINESE ACADEMY OF SCIENCES, Guangzhou, Guangdong (CN)

( * ) Notice: Subject to any disclaimer, the term of this patent is extended or adjusted under 35 U.S.C. 154(b) by 1 day.

(21) Appl. No.: 15/503,576

(22) PCT Filed: Jun. 3, 2016

(86) PCT No.: PCT/CN2016/084798
§ 371 (c)(1),
(2) Date: Feb. 13, 2017

(87) PCT Pub. No.: WO2017/190396
PCT Pub. Date: Nov. 9, 2017

(65) Prior Publication Data
US 2018/0162957 A1 Jun. 14, 2018

(30) Foreign Application Priority Data

May 4, 2016 (CN) .......................... 2016 1 0294573

(51) Int. Cl.
| A23L 5/20 | (2016.01) |
| A23L 19/00 | (2016.01) |
| C08B 37/00 | (2006.01) |

(52) U.S. Cl.
CPC .......... C08B 37/0018 (2013.01); A23L 5/23 (2016.08); A23L 5/27 (2016.08); A23L 19/09 (2016.08); C08B 37/0003 (2013.01); C08B 37/0009 (2013.01); *A23V 2002/00* (2013.01); *A23V 2300/14* (2013.01); *A23V 2300/30* (2013.01)

(58) Field of Classification Search
CPC .......... C08B 37/0003; C08B 37/0009; C08B 37/0018; C08B 37/0021
See application file for complete search history.

(56) References Cited

FOREIGN PATENT DOCUMENTS

| CN | 101709095 A | 5/2010 |
| CN | 104861085 A | 8/2015 |
| JP | 11-140102 | * 5/1999 |

OTHER PUBLICATIONS http://www.sigmaaldrich.com/life-science/core-bioreagents/biological-buffers/learning-center/buffer-reference-center.html (Year: 2009).*
Machine translation of CN 104861085. (Year: 2015).*
Cui, H. et al "Structure and chain conformation of a (1,6)-alpha-D-glucan . . . " Carbohyd. Polym., vol. 74, pp. 771-778. (Year: 2008).*
Machine translation of JP 11-140102. (Year: 1999).*
Machine translation of CN 101709095. (Year: 2010).*

* cited by examiner

*Primary Examiner* — Leigh C Maier
(74) *Attorney, Agent, or Firm* — Westerman, Hattori, Daniels & Adrian, LLP

(57) ABSTRACT

A process for preparing (1→6)-α-D-glucan. A large amount of (1→6)-α-D-glucan can be prepared from banana by using this process. The chemical structure of (1→6)-α-D-glucan is shown as Scheme 1. The yield of (1→6)-α-D-glucan is 3-16 g/kg (with a purity of 85%-95%). This process provides a feasible technique for extensive utilization of banana, and can improve the additional value of banana products. This process is helpful for the sustainable development of banana processing industry.

Scheme 1.

10 Claims, No Drawings

PROCESS FOR PREPARING (1→6)-α-D-GLUCAN

TECHNICAL FIELD

This invention relates to the field of agricultural products processing, particularly to a process using banana as material to prepare (1→6)-α-D-glucan.

BACKGROUND OF THE INVENTION

Banana (*Musa nana* Lour.) is an important horticultural crop with an annual production higher than most of the commercial fruits over the world. Banana tastes sweet and has attractive flavor. It also contains abundant nutrients and bioactive compounds. These chemicals are helpful to prevent constipation and to improve the micro-environment in intestinal tract. A large amount of bioactive carbohydrates, such as polysaccharides and oligosaccharides, have been detected in banana. Their contents account for ca. 20% of banana weight. These bioactive carbohydrates contribute much to the health benefits of banana. Up to now, the information regarding banana polysaccharide structure is limited. The structural characteristics of leading polysaccharides in banana remain unclear. Therefore, it is necessary to purify banana polysaccharides and identify the structure characteristics. This is helpful to understand the chemical composition of banana.

SUMMARY OF THE INVENTION

The aim of this invention is to providing a process for preparing (1→6)-α-D-glucan from banana.

This invention gives a way to prepare the leading polysaccharide in banana. The structure is identified to be (1→6)-α-D-glucan by nuclear magnetic resonance spectra. The chemical structure is shown in Scheme 1.

Scheme 1.

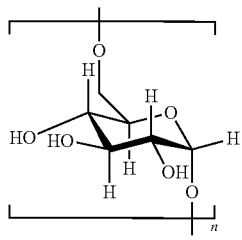

This invention introduces a process to prepare (1→6)-α-D-glucan from banana, comprising the following steps:

Extracting banana pulp with water to give a supernatant separating, collecting and concentrating the supernatant, adding ethanol into the concentrated supernatant to precipitate crude banana polysaccharides and collecting the crude banana polysaccharides; purifying the crude banana polysaccharides with anion exchange resin, and eluting with water or phosphate solution to obtain a fraction eluted with water or a fraction eluted with phosphate solution; concentrating and drying the fraction eluted with water to obtain the (1→6)-α-D-glucan, or, concentrating, dialyzing and drying the fraction eluted with phosphate solution to obtain the (1→6)-α-D-glucan.

Preferably, the purifying the crude banana polysaccharides with anion exchange resin and eluting with water comprises: purifying the crude banana polysaccharides over an anion exchange column and eluting with water to obtain a fraction eluted with water, and concentrating and drying the fraction eluted with water to obtain the (1→6)-α-D-glucan.

Preferably, the purifying the crude banana polysaccharides with anion exchange resin and eluting with phosphate solution comprises: purifying the crude banana polysaccharides over an anion exchange column and eluting with phosphate solution of pH 7.0 to obtain a fraction eluted with phosphate solution, and concentrating, dialysing and drying the fraction eluted with phosphate solution to obtain the (1→6)-α-D-glucan.

Preferably, the extracting banana pulp with water comprises: adding the banana pulp into water wherein a weight of the water is 1-30 times of that of the banana pulp, and performing extraction at a temperature ranging from ambient temperature (25° C.) to 100° C. for 1-120 hours.

Preferably, the separating the supernatant is by means of centrifugation or filtration.

Preferably, in the adding ethanol into the concentrated supernatant, a final volume fraction of the ethanol is 20%-90%.

The banana pulp is fresh banana pulp or dried banana pulp.

This invention further introduces an application of banana pulp in preparing (1→6)-α-D-glucan.

This invention introduces a process of preparing (1→6)-α-D-glucan from banana pulp. The yield of (1→6)-α-D-glucan is 3-16 g/kg (with a purity of 85%-95%). This invention gives a new technique to prepare (1→6)-α-D-glucan. It is helpful for extensive utilization of banana and improving the additional value of banana products.

EMBODIMENTS OF THE INVENTION

The following embodiments are used for further describing this invention rather than limiting the invention.

Embodiment 1: Preparation and Structure Identification of (1→6)-α-D-glucan

1. Preparation of (1→6)-α-D-glucan

1) Material: Fresh bananas are collected and the pulps are obtained by removing the peels.

2) Extraction: Water is added to the banana pulps wherein a weight of the water is 10 times of that of the banana pulps. The extraction is conducted at 60° C. for 1 hour. After centrifugation, the supernatants are collected.

3) Solvent precipitation: The supernatants are concentrated and ethanol is added to a final concentration of 90% (volume/volume). After incubation at 4° C. for 12 hours, the pellets are collected by centrifugation. The pellets are crude banana polysaccharides.

4) Column purification: The crude banana polysaccharides are purified over a DEAE Sepharose Fast Flow anion exchange column which is eluted with water and subsequently with 1M NaCl solution. The fraction eluted with water is collected, concentrated and dried and thereby a compound 1 ((1→6)-α-D-glucan) is obtained. The yield of (1→6)-α-D-glucan prepared by this protocol is 8-12 g/kg. The purity is 85%-95%.

2. Structure Identification of the Compound 1 ((1→6)-α-D-glucan)

Compound 1 ((1→6)-α-D-glucan) is water soluble. Through analyses by $^1$H NMR (500 MHz, $D_2O$) and $^{13}$C NMR (125 MHz, $D_2O$), the chemical shifts are assigned and listed in Table 1.

TABLE 1

The $^1$H and $^{13}$C chemical shifts of (1→6)-α-D-glucan

| Position | $^1$H | $^{13}$C |
|---|---|---|
| 1 | 5.01, d, J = 2.4 Hz | 97.7 |
| 2 | 3.59, d, J = 9.5 Hz | 71.4 |
| 3 | 3.74, d, J = 9.5 Hz | 73.4 |
| 4 | 3.56, d, J = 9.5 Hz | 69.8 |
| 5 | 3.95, d, J = 7.5 Hz | 70.0 |
| 6 | 4.03, d, J = 7.5 Hz; 3.81, d, J = 12.5 Hz | 65.3 |

According to the NMR results, the compound 1 is identified as (1→6)-α-D-glucan. The structure is shown in Scheme 1.

Scheme 1.

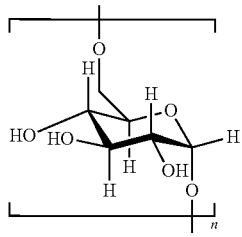

Embodiment 2

1) Material: Fresh bananas are collected and the pulps are obtained by removing the peels.

2) Extraction: Water is added to the banana pulps wherein a weight of the water is the same with that of the banana pulps. The extraction is conducted at 25° C. (Ambient temperature) for 120 hours. After filtration, the supernatants are collected.

3) Solvent precipitation: The supernatants are concentrated and ethanol is added to a final concentration of 20% (volume/volume). After incubation at 4° C. for 12 hours, the pellets are collected by centrifugation. The pellets are crude banana polysaccharides.

4) Column purification: The crude banana polysaccharides are purified over a DEAE Sepharose Fast Flow anion exchange column which is eluted with water and subsequently with 1M NaCl solution. The fraction eluted with water is collected, concentrated and dried and thereby (1→6)-α-D-glucan is obtained (structure identification shows the same result with embodiment 1).

The yield of (1→6)-α-D-glucan prepared by this protocol is 3-8 g/kg. The purity is 85%-95%.

Embodiment 3

1) Material: Fresh bananas are collected and the pulps are obtained by removing the peels.

2) Extraction: Water is added to the banana pulps wherein a weight of the water is 30 times of that of the banana pulps. The extraction is conducted at 100° C. for 5 hours. After filtration, the supernatants are collected.

3) Solvent precipitation: The supernatants are concentrated and ethanol is added to a final concentration of 60% (volume/volume). After incubation at 4° C. for 12 hours, the pellets are collected by centrifugation. The pellets are crude banana polysaccharides.

4) Column purification: The crude banana polysaccharides are purified over a DEAE Sepharose Fast Flow anion exchange column which is eluted with water and subsequently with 1M NaCl solution. The fraction eluted with water is collected, concentrated and dried and thereby (1→6)-α-D-glucan is obtained (structure identification shows the same result with embodiment 1).

The yield of (1→6)-α-D-glucan prepared by this protocol is 12-16 g/kg. The purity is 85%-95%.

Embodiment 4

1) Material: Fresh bananas are collected and the pulps are obtained by removing the peels.

2) Extraction: Water is added to the banana pulps wherein a weight of the water is 30 times of that of the banana pulps. The extraction is conducted at 60° C. for 5 hours. After filtration, the supernatants are collected.

3) Solvent precipitation: The supernatants are concentrated and ethanol is added to a final concentration of 80% (volume/volume). After incubation at 4° C. for 12 hours, the pellets are collected by centrifugation. The pellets are crude banana polysaccharides.

4) Column purification: The crude banana polysaccharides are purified over a DEAE cellulose anion exchange column which is eluted with phosphate solution (pH 7.0) and subsequently with phosphate solution (pH 7.0) containing 1M of NaCl. The fraction eluted with phosphate solution (pH 7.0) is collected, concentrated, dialysed and dried and thereby (1→6)-α-D-glucan is obtained (structure identification shows the same result with embodiment 1).

The yield of (1→6)-α-D-glucan prepared by this protocol is 9-13 g/kg. The purity is 85%-95%.

The invention claimed is:

1. A process for preparing (1→6)-α-D-glucan, comprising the following steps:
    extracting banana pulp with water to give a supernatant;
    separating, collecting and concentrating the supernatant, adding ethanol into the concentrated supernatant to precipitate crude banana polysaccharides, and collecting the crude banana polysaccharides;
    purifying the crude banana polysaccharides with anion exchange resin, and eluting with water or phosphate solution to obtain a fraction eluted with water or a fraction eluted with phosphate solution; concentrating and drying the fraction eluted with water to obtain the (1→6)-α-D-glucan, or, concentrating, dialyzing and drying the fraction eluted with phosphate solution to obtain the (1→6)-α-D-glucan.

2. The process according to claim 1, comprising purifying the crude banana polysaccharides over an anion exchange column and eluting with water to obtain a fraction eluted with water, and concentrating and drying the fraction eluted with water to obtain the (1→6)-α-D-glucan.

3. The process according to claim 1, comprising purifying the crude banana polysaccharides over an anion exchange column and eluting with phosphate solution of pH 7.0 to obtain a fraction eluted with phosphate solution, and concentrating, dialyzing and drying the fraction eluted with phosphate solution to obtain the (1→6)-α-D-glucan.

4. The process according to claim 1, wherein extracting banana pulp with water comprises: adding the banana pulp into water wherein a weight of the water is 1-30 times that of the banana pulp, and performing extraction at 25-100° C. for 1-120 hours.

5. The process according to claim 1, wherein separating the supernatant is by centrifugation or filtration.

6. The process according to claim 1, wherein in the step of adding ethanol into the concentrated supernatant, a final volume fraction of the ethanol is 20%-90%.

7. The process according to claim 1, wherein the banana pulp is fresh banana pulp or dried banana pulp.

8. A method of using banana pulp in preparing (1→6)-α-D-glucan, comprising the steps:
   extracting banana pulp with water to give a supernatant;
   separating, collecting and concentrating the supernatant,
   adding ethanol into the concentrated supernatant to precipitate crude banana polysaccharides, and collecting the crude banana polysaccharides;
   purifying the crude banana polysaccharides with anion exchange resin, and eluting with water or phosphate solution to obtain a fraction eluted with water or a fraction eluted with phosphate solution; concentrating and drying the fraction eluted with water to obtain the (1→6)-α-D-glucan, or, concentrating, dialyzing and drying the fraction eluted with phosphate solution to obtain the (1→6)-α-D-glucan.

9. The method according to claim 8, comprising purifying the crude banana polysaccharides over an anion exchange column and eluting with water to obtain a fraction eluted with water, and concentrating and drying the fraction eluted with water to obtain the (1→6)-α-D-glucan.

10. The method according to claim 8, comprising purifying the crude banana polysaccharides over an anion exchange column and eluting with phosphate solution of pH 7.0 to obtain a fraction eluted with phosphate solution, and concentrating, dialyzing and drying the fraction eluted with phosphate solution to obtain the (1→6)-α-D-glucan.

* * * * *